(12) United States Patent
Cherubini et al.

(10) Patent No.: US 10,592,147 B2
(45) Date of Patent: Mar. 17, 2020

(54) DATASET RELEVANCE ESTIMATION IN STORAGE SYSTEMS

(71) Applicant: INTERNATIONAL BUSINESS MACHINES CORPORATION, Armonk, NY (US)

(72) Inventors: Giovanni Cherubini, Rueschlikon (CH); Mark A. Lantz, Thalwil (CH); Taras Lehinevych, Kyiv (UA); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 15/660,434

(22) Filed: Jul. 26, 2017

(65) Prior Publication Data

US 2019/0034083 A1 Jan. 31, 2019

(51) Int. Cl.
*G06F 16/30* (2019.01)
*G06F 3/06* (2006.01)

(52) U.S. Cl.
CPC ............ *G06F 3/064* (2013.01); *G06F 3/0604* (2013.01); *G06F 3/067* (2013.01); *G06F 3/0611* (2013.01); *G06F 3/0631* (2013.01); *G06F 3/0649* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 8,930,385 B2 | 1/2015 | Poltorak | |
| 9,495,641 B2 | 11/2016 | Schmidt | |
| 9,542,446 B1 | 1/2017 | Duffield et al. | |
| 9,753,987 B1 | 9/2017 | Dolan et al. | |
| 2010/0138388 A1 | 6/2010 | Wakeling et al. | |
| 2010/0312725 A1* | 12/2010 | Privault | G06N 5/043 706/12 |
| 2012/0278261 A1 | 11/2012 | Lin et al. | |
| 2014/0280144 A1* | 9/2014 | Heit | G06F 16/35 707/737 |
| 2016/0062689 A1 | 3/2016 | Cherubini et al. | |

(Continued)

OTHER PUBLICATIONS

Cherubini, et al., "Dataset Relevance Estimation in Storage Systems", U.S. Appl. No. 15/857,796, filed Dec. 29, 2017, pp. 1-45.

(Continued)

*Primary Examiner* — Tarek Chbouki
(74) *Attorney, Agent, or Firm* — Anthony M. Pallone

(57) ABSTRACT

The invention is notably directed to computer-implemented methods and systems for managing datasets in a storage system. In such systems, it is assumed that a (typically small) subset of datasets are labeled with respect to their relevance, so as to be associated with respective relevance values. Essentially, the present methods determine, for each unlabeled dataset of the datasets, a respective probability distribution over a set of relevance values. From this probability distribution, a corresponding relevance value can be obtained. This probability distribution is computed based on distances (or similarities), in terms of metadata values, between said each unlabeled dataset and the labeled datasets. Based on their associated relevance values, datasets can then be efficiently managed in a storage system.

13 Claims, 7 Drawing Sheets

(56) References Cited

U.S. PATENT DOCUMENTS

| | | | |
|---|---|---|---|
| 2016/0070492 A1 | 3/2016 | Cherubini et al. | |
| 2016/0231928 A1 | 8/2016 | Lewis et al. | |
| 2016/0379139 A1* | 12/2016 | Eldar | G06F 16/35 |
| | | | 706/12 |
| 2017/0091671 A1* | 3/2017 | Mitarai | G06N 7/005 |
| 2017/0116332 A1* | 4/2017 | Andrade Silva | G06N 7/005 |

OTHER PUBLICATIONS

IBM Appendix P, "List of IBM Patents or Patent Applications to be Treated as Related", Dated Dec. 29, 2017, 2 pages.

Khurana, et al., "Graph Based Exploration of Non Graph Datasets", Proceedings of the VLDB Endowment, Copyright 2016, pp. 1557-1560, vol. 9, No. 13, United States.

Deng, et al., "The Data Civilizer System", 8th Biennial Conference on Innovative Data Systems Research (CIDR '17), Jan. 8-11, 2017, 7 Pages, Chaminade, California.

Mell et al., "The NIST Definition of Cloud Computing", NIST, Sep. 2011, pp. 1-7, Special Publication 800-145, U.S. Department of Commerce, Gaithersburg, MD.

Sun, et al., "Relevance Search and Anomaly Detection in Bipartite Graphs", Dec. 2005, pp. 48-55, SIGKDD Explorations, vol. 7, Issue 2.

Yin, et al., "Ranking Relevance in Yahoo Search", KDD'16, Aug. 13-17, 2016, Copyright 2016, 10 Pages.

He, et al., "BiRank: Towards Ranking on Bipartite Graphs", IEEE Transactions on Knowledge and Data Engineering, Jan. 2017, pp. 57-71, vol. 29, No. 1.

IBM, et al., "IBM Content Classification", Printed on Jul. 26, 2017, 1 Page, https://www.ibm.com/us-en/marketplace/content-classification.

U.S. Appl. No. 15/467,423, entitled "Managing Digital Datasets on a Multi-Tiered Storage System Based on Predictive Caching", Filed Mar. 23, 2017, 36 Pages.

Cherubini, et al., "Cognitive Storage for Big Data", Computer, vol. 49, No. 4, Copyright 2016 IEEE, Apr. 2016, pp. 43-51.

University of Leicester, "What can Google tell us about 'the memory web' in the brain?", Science-daily, Nov. 15, 2016, Printed on Jul. 26, 2017, pp. 1-3, http://www.sciencedaily.com/releases/2016/11/16115121254.htm.

Branch et al., "A subspace, interior, and conjugate gradient method for large-scale bound-constrained minimization problems", SIAM Journal on Scientific Computing, vol. 21, No. 1, pp. 1-23, 1999.

Jones et al., SciPy: Open source scientific tools for Python, 2001, Abstract, 1 page.

Liu et al., "On the limited memory BFGS method for large scale optimization", Mathematical Programming, vol. 45, Issues 1-3, pp. 503-528, 1989.

Zhu et al., "Algorithm, 778: L-BFGS-B: Fortran subroutines for large-scale bound-constrained optimization", ACM Transactions on Mathematical Software (TOMS), vol. 23, No. 4, pp. 550-560, 1997.

Pending U.S. Appl. No. 16/390,214, filed Apr. 22, 2019, entitled: "Dataset Relevance Estimation in Storage Systems", pp. 1-52.

IBM: List of IBM Patents or Patent Applications Treated as Related (Appendix P), May 22, 2019, 2 pages.

* cited by examiner

DATASET RELEVANCE ESTIMATION IN STORAGE SYSTEMS

BACKGROUND

The invention relates in general to the field of computer-implemented methods and systems for managing datasets (e.g., files) in a storage system. In particular, it is directed to methods and systems for managing datasets across storage tiers of a storage system, based on their relevance.

Multi-tiered storage systems may comprise several tiers of storage. Such systems typically assign different categories of data to various types of storage media, in order to reduce the global storage cost, while maintaining performance. A tiered storage system usually relies on policies that assign most frequently accessed data to high-performance storage tiers, whereas rarely accessed data are stored on low-performance (cheaper, and/or slower) storage tiers.

SUMMARY

The invention is notably directed to computer-implemented methods and systems for managing datasets in a storage system. In such systems, it is assumed that a (typically small) subset of datasets are labeled with respect to their relevance, so as to be associated with respective relevance values. Essentially, the present methods determine, for each unlabeled dataset of the datasets, a respective probability distribution over a set of relevance values. From this probability distribution, a corresponding relevance value can be obtained. This probability distribution is computed based on distances (or similarities), in terms of metadata values, between said each unlabeled dataset and the labeled datasets. Based on their associated relevance values, datasets can then be efficiently managed in a storage system.

BRIEF DESCRIPTION OF THE DRAWINGS

The following detailed description, given by way of example and not intended to limit the invention solely thereto, will best be appreciated in conjunction with the accompanying drawings.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

Figure 1:
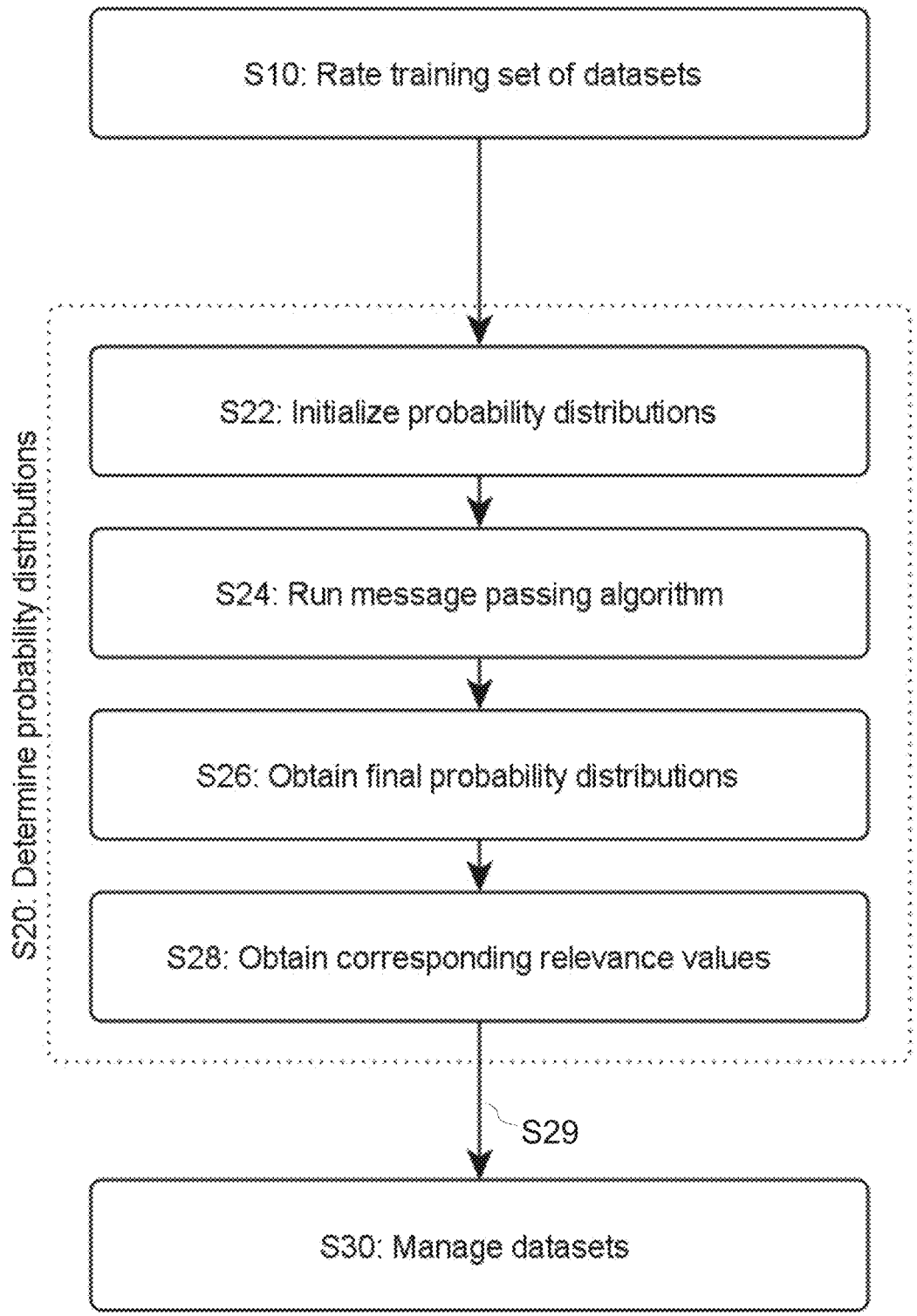
FIG. 1 is a flowchart illustrating high-level steps of a method for managing datasets in a storage system, as in embodiments.

Consider for example a storage system wherein applications are run on large batches of datasets (e.g., astronomical data repositories, financial transaction logs, medical data repositories). Data that have not been accessed for long periods of time (also called "cold data") are stored on cheaper (energy efficient) media such as tapes. However, accessing data from such media is also slower and this implies a substantial drop in performance of applications running on data stored in these media.

According to a first aspect, the present invention is embodied as computer-implemented methods for managing datasets in a storage system. In this system, it is assumed that a (typically small) subset of datasets are labeled with respect to their relevance, so as to be associated with respective relevance values. Essentially, the present methods determine, for each unlabeled dataset of the datasets, a respective probability distribution over a set of relevance values. From this probability distribution, a corresponding relevance value can be obtained. This probability distribution is computed based on distances (or similarities), in terms of metadata values, between said each unlabeled dataset and the labeled datasets. Based on their associated relevance values, datasets can then be efficiently managed in the storage system.

The relevance (or value) of data is a metric associated with datasets (e.g., files) that represents the importance of such datasets to a user. In a cognitive storage system, the relevance of a file can be used to determine its storage policies to reduce storage costs while retaining reliability and performance for the sets of files. The relevance of a file can be estimated by obtaining samples of important and unimportant files from the user and applying a supervised learning algorithm to estimate the relevance metric for other files using the file metadata as features.

In the above scheme, at least distances (or similarities) between each unlabeled dataset and labeled datasets are taken into account. However, the algorithm may in fact consider distances between each unlabeled dataset and any other datasets in the storage system (including datasets not labelled yet). For example, the above probability distribution can notably be computed based on a sum of weighted, initial probability distributions associated with other datasets of the system, i.e., including unlabeled datasets. Initial probability distributions of given datasets are determined as a probability distribution over said relevance values, according to relevance values associated with the given datasets. The sum is typically weighted according to inverse distances between said each unlabeled dataset and said other datasets.

Preferably, supersets of labeled datasets are defined, based on metadata available for the datasets. Thus, each dataset can be associated to at least one of the supersets defined, by comparing metadata available for said each dataset with metadata used to define said at least one of the supersets. In that case, the needed probability distributions (as associated with unlabeled datasets) can be determined based on a sum of weighted, initial probability distributions associated with other datasets of the superset(s) with which said each unlabeled dataset is associated. The needed probability distributions can efficiently be computed thanks to a message passing algorithm on a heterogeneous bipartite graph.

According to another aspect, the invention can be embodied as a storage system, storing datasets. Again, only a subset of the datasets are assumed to be labeled with respect to their relevance. The system may include a relevance determination unit, configured to determine probability distributions associated with unlabeled datasets and, in turn, corresponding relevance values, following principles discussed above. The system may further include a management policy unit, the latter configured to manage datasets in the storage system based on the relevance values accordingly determined, in operation. The management policy unit may for instance be configured to store datasets across storage tiers of the storage system, according to a storage management policy that takes relevance values of the datasets as input.

According to a final aspect, the invention is embodied as a computer program product for managing datasets in a storage system. The computer program product may include a computer readable storage medium having program instructions embodied therewith, wherein the program instructions are executable by a computerized system to cause to take steps according to the present methods.

Computerized device, systems, methods, and computer program products embodying the present invention will now be described, by way of non-limiting examples, and in reference to the accompanying drawings.

As present Inventors have realized, the known supervised learning algorithms (e.g., naïve Bayes or Information Bottleneck) require a large number of training samples to achieve acceptable estimation accuracy. To address this, they have developed new learning methods that can achieve high estimation accuracy while requiring substantially fewer training samples.

In reference to FIGS. 1-4, an aspect of the invention is first described, which concerns a computer-implemented method for managing datasets 51, 52 in a storage system 1. A subset 51 of the datasets 51, 52 are assumed to have been labeled with respect to their relevance. The datasets 51 are thus associated with respective relevance values, which represent the importance or value of such datasets 51 to a user, or an application.

Essentially, the present methods revolve around determining (step S20, FIG. 1), for each unlabeled dataset 52 of the datasets 51, 52, a respective probability distribution over a set of relevance values. This, in turn, makes it possible to obtain a corresponding relevance value for each dataset 52 that is initially not labeled. The needed probability distribution is computed based on distances, in terms of metadata values, between the unlabeled dataset 52 and the labeled datasets 51. Said distances could as well be regarded as similarities between the datasets. I.e., the more similar the datasets, the closer they are and the shorter the distance between them. This assumes that suitable distance metrics are available, thanks to which distances between the datasets can be computed, as exemplified later.

As a result, all the datasets 51, 52 as stored on the storage system 1 can be associated with relevance values, based on which the datasets can be managed S30 in the storage system 1. The relevance of the datasets can indeed advantageously be relied on to efficiently manage the datasets, e.g., to store, duplicate (reach a given level of redundancy), refresh, and/or garbage collect the datasets, etc., according to their relevance. That is, the dataset management policy shall depend on the relevance values of the datasets 51, 52.

Interestingly here, the relevance of the initially unlabeled datasets 52 is inferred from a (reduced) training set of already labeled datasets 51. This is achieved by leveraging probability distribution functions associated with the already labeled datasets 51. From these initial distribution functions, distribution functions can be inferred for the unlabeled datasets 52 too. From there, relevance values can be obtained, obtained values are then used to manage the datasets in the storage system.

"Unlabeled datasets" 52 are datasets whose relevance has not initially been rated by a user or an application, contrary to labeled datasets 51, which can be regarded as a training set. Now, when running the above process, the system extrapolates relevance values for the initially unlabeled datasets 52 from relevance values of the initially labeled datasets 51, so as to rate the unlabeled datasets 52. On completion of the process, the initially unlabeled datasets 52 are associated with relevance values and thus can be regarded as "labeled" by the system. Still, the datasets of the training set, as initially rated by a user/an application, should be distinguished from the datasets 52 as eventually labeled by the system, as the datasets 52 are automatically and cognitively rated, at a subsequent stage of the process. Typically, only a small or very small (e.g., less than 1 or 0.1%) fraction of the total datasets need initially be rated, prior to implementing the present methods. This represents a substantial improvement over known supervised learning techniques, which typically require larger training sets.

The present algorithms may in fact consider distances between each unlabeled dataset and any other datasets, these possibly including unlabeled datasets. In that respect, the needed probability distributions are preferably computed based on a sum of weighted, initial probability distributions associated with other datasets of the system (i.e., any type of datasets, possibly including unlabeled datasets). As explained later in detail, an initial probability distribution of a given dataset can be determined S10 as a probability distribution over a set of relevance values, based on a known relevance value, associated with that given dataset.

For example, the above sum can be computed as a sum of weighted, initial probability distributions associated with labeled datasets of the system, where initial probability distributions can easily be extrapolated from known relevance values as initially associated with the labeled datasets 51.

Yet, sophisticated algorithms, e.g., relying on message-passing, can be involved to obtain massive sets of probability distributions associated with unlabeled datasets 52, whereby a plurality of datasets 52 can altogether get rated, based on a restricted set of labeled datasets 51, as explained later in detail. Such algorithms will typically involve distances (or similarities), in terms of metadata values, between, on the one hand, each of the plurality of plurality of datasets 52 and, on the other hand, other datasets, these including other, unlabeled datasets 52, i.e., not only the labeled datasets 51.

For instance, the sum of initial probability distributions may be weighted according to inverse distances between, on the one hand, the unlabeled dataset 52 (whose probability distribution in terms of relevance value is sought) and, on the other hand, the other datasets considered. Suitable distance metrics can be relied on, as discussed later. Hence, the closer the datasets considered are to the unlabeled datasets of interest, the more impact they have on the sought probability distributions.

The required weights may for instance be taken as any reasonable function (e.g., an inverse power) of the distance. Preferably, the weights are equal to the inverse of the distance between the datasets.

Figure 2:
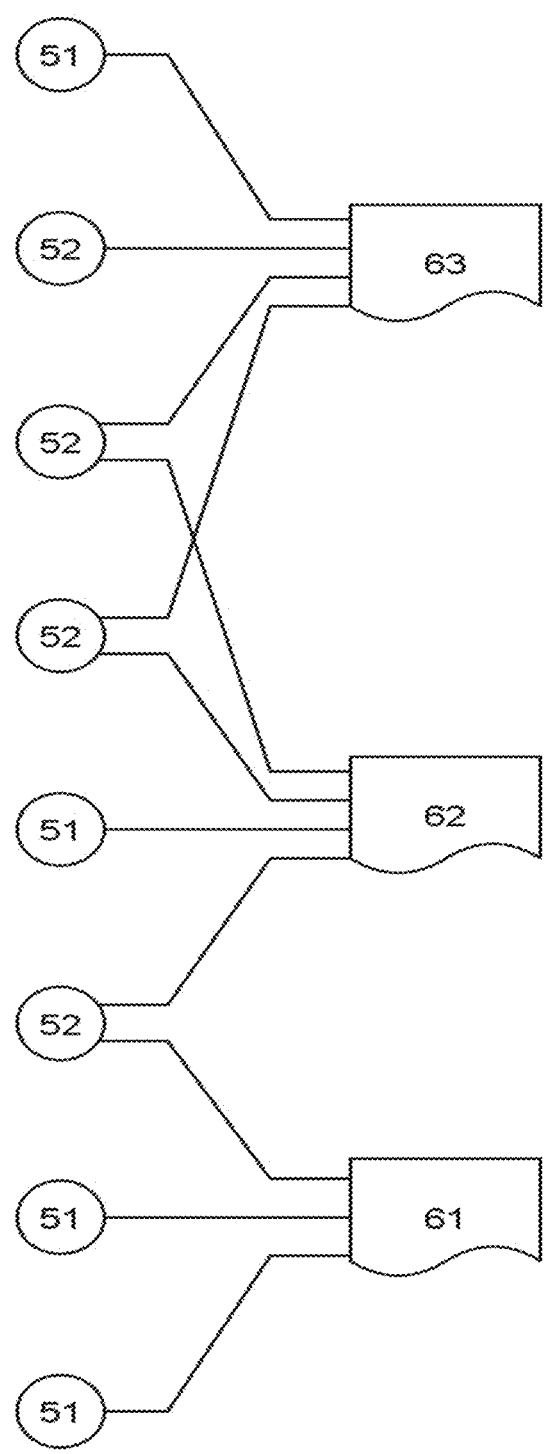
FIG. 2 is a diagram schematically illustrating labeled and unlabeled datasets, wherein the datasets are associated with supersets, as involved in embodiments.
Figure 3:
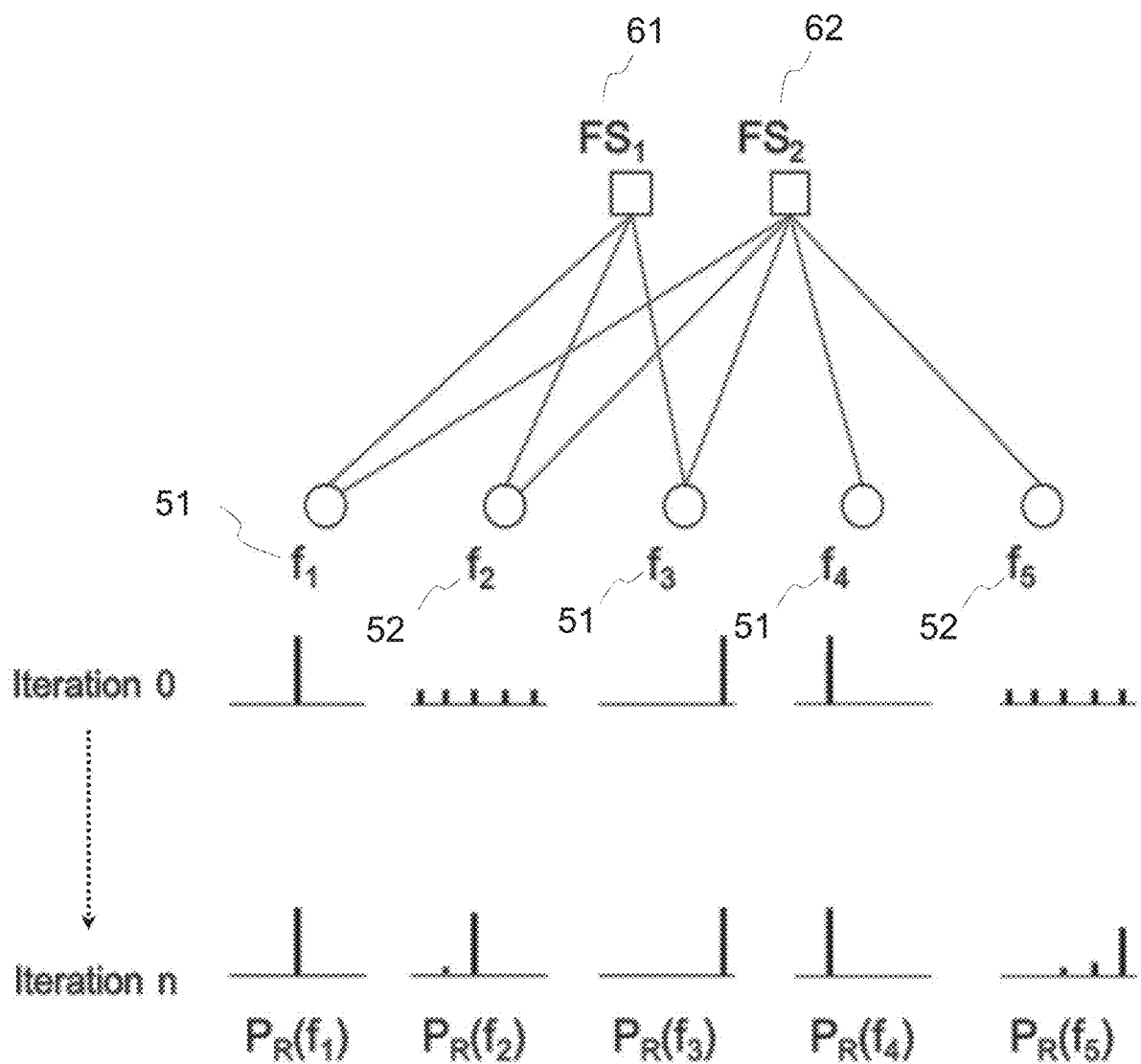
FIG. 3 is another diagram schematically illustrating a message-passing algorithm, where messages are passed along edges of a heterogeneous bipartite graph, as involved in embodiments.

Referring now more particularly to FIGS. 2, 3, in embodiments, the present methods further involve supersets 61-63 of labeled datasets 51. Such supersets are defined prior to determining probability distributions associated with the unlabeled datasets 52. The supersets can for instance be defined based on metadata (e.g., metadata fields) available for the datasets 51, 52, as explained later in detail. Then, as illustrated in FIG. 2, each dataset 51, 52 can be associated to one or more of the supersets 61-63 so defined. This can be achieved by comparing metadata (e.g., metadata fields) available for the datasets 51, 52 with the metadata (e.g., metadata fields) used to define each of the supersets 61-63.

In that case, the probability distributions sought (which pertain to unlabeled datasets 52) will typically be determined based on one or more sums of weighted, initial probability distributions associated with other datasets of the one or more supersets 61-63, respectively.

At least one sum of weighted distributions is needed for each unlabeled dataset 52 for which one wants to compute a probability distribution. I.e., this sum involves probability distributions associated with datasets of the at least one superset with which said each unlabeled dataset is associated. However, since each unlabeled dataset 52 will likely be associated with several supersets, the needed probability distributions (as eventually associated with unlabeled datasets 52) will likely be determined, each, based on several sums of weighted, initial probability distributions, as respectively obtained for those several supersets 61-63.

Note that "supersets" are sometimes referred to as "file-sets" in the present description, as the datasets typically form files. As we shall see, a superset is typically defined as the set of all files in the storage system 1 that have at least a fraction q of the metadata fields in a group of metadata fields. Thus, each dataset (e.g., a file) in a superset (e.g., a file-set) has a number of common metadata fields with all other files of the same superset.

Also, for each dataset, any information about the dataset that can be observed by the system can be considered as part of its metadata. This includes both content-dependent information and context-dependent information. Thus, the notion of supersets can be extended to context-dependent supersets.

The distances between datasets are preferably computed according to specific distance metrics, i.e., metrics that are respectively associated with the supersets 61-63 of interest. Suitable distance metrics can, for instance, be determined based on metadata fields associated with the datasets in each superset 61-63 of interest. As discussed below, this may not only include common metadata fields (i.e., metadata fields shared by all datasets of a given superset) but, also, unshared (i.e., rare) metadata fields. In all cases, distinct supersets 61-63 may have distinct distance metrics associated therewith, since distinct supersets typically involve distinct sets of metadata fields.

For example, if distance metrics are determined based on common metadata fields shared by all datasets of a given superset 61-63 of interest, then the distance between two datasets $f_1$, $f_2$ of that superset can for instance be computed as a symmetric divergence measure between two conditional probability distributions $P(R|k,v_k(f_1))$ and $P(R|k,v_k(f_2))$. Here the two conditional probability distributions respectively pertain to the two datasets $f_1$, $f_2$. A Jensen-Shannon divergence may for instance be used. The above conditional probability distribution $P(R|k,v_k(f))$ is an empirical distribution of probability, which is obtained from the labeled datasets 51. Such a conditional probability distribution can be regarded as a probability of observing a given relevance value R when a file f has metadata values $v_k(f)$, for a set of metadata fields k.

In more sophisticated embodiments, the distance metric associated to a given superset is determined as a combination of: (i) symmetric divergence measures between conditional probability distributions (as exemplified above) and (ii) distances between uncommon (or rare) metadata fields. In the latter case, the distance can for example be obtained by applying a logistic regression model for the metadata values of metadata fields for two files and then by comparing the outcomes, see Eqs. (40)-(41) in section 2. Note that considering the ranges of values for metadata fields can be leveraged to define context-dependent supersets.

In embodiments relying on supersets, as assumed in FIG. 2, the needed probability distributions (as eventually associated with unlabeled datasets 52) can be computed thanks to auxiliary probability distributions. That is, for each unlabeled dataset 52, an auxiliary probability distribution (over a set of relevance values) is computed for each superset 61-63 of interest, i.e., to which said each unlabeled dataset 52 belongs. Each auxiliary probability distribution can for instance be computed as a sum of weighted, initial probability distributions, as explained earlier. I.e., the initial probability distributions are respectively associated with all datasets (but said each unlabeled dataset) of a given superset 61-63. Again, the initial probability distributions are preferably weighted according to inverse distances between the datasets.

Eventually, the probability distribution sought for a given, unlabeled dataset 52 can be obtained as a simple function of all the auxiliary probability distributions computed for that given, unlabeled dataset 52. Once all auxiliary probability distributions have been obtained, several ways can be contemplated to obtain the final probability distribution. One may for instance multiply all the auxiliary probability distributions (as computed for each superset with which that given, unlabeled dataset is connected), to average out relevance values as obtained from the several supersets to which this dataset is connected. One may further multiply the result by the input distribution, as initially attributed to that given, unlabeled dataset 52, at initialization, and normalize the result, e.g., by dividing the result of the multiplication by a constant such that the probabilities sum to one, as explained in detail in sect. 2. In variants, only a subset of the auxiliary probability distributions may be used, selected, e.g., based on the number of metadata fields involved in the corresponding supersets.

As evoked above, the present methods typically request an initialization step, during which probability distributions as associated with the datasets 51, 52 are initialized S10. This may notably be achieved as illustrated in FIG. 3 (iteration 0). That is, a Dirac delta function may be associating to each labeled dataset 51, since the latter has a known relevance value. I.e., the resulting Dirac delta function is centered on this known relevance value. However, because the relevance value of unlabeled datasets 52 is initially unknown, by definition, one may associate them with uniform distributions, i.e., a distribution that is uniform over each potential relevance value. Still, other initialization schemes could be contemplated, which may for example reflect a known bias or prejudice in the statistical distributions over relevance values, where applicable.

The present methods are preferably implemented thanks to a message-passing algorithm, as further illustrated in FIG. 3. To that aim, a heterogeneous bipartite factor graph need be defined. I.e., a graph is defined, which exhibits two types of nodes. Thus, datasets and supersets are associated with a first type of nodes and a second type of nodes of the graph, respectively, as assumed in FIG. 3.

With the help of such a graph, unlabeled datasets 52 can easily be associated with supersets, i.e., by merely connecting each unlabeled dataset 52 to one or more nodes of the second type of the graph. This way, the probability distribution associated with each unlabeled dataset 52 can now be computed S24 thanks to a message passing algorithm run on the heterogeneous bipartite graph, whereby probability distributions are passed as messages along edges of the graph that connect pairs of nodes of different types. The probability distributions are refined, at each iteration.

The messages $P_R(f)$ sent at each iteration of the algorithm to the connected datasets f are based on probability distributions associated with other datasets (i.e., datasets that are also connected to the same supersets 61-63) and distances between the connected datasets, as explained earlier.

For example, assume that each dataset is suitably connected to each superset (or file-sets) to which it belongs, as per some suitable metrics. For example, in FIG. 3, files $f_1$-$f_3$ are, each, connected to the first file-set $FS_1$, while all files $f_1$-$f_5$ are, each, connected to the second file-set $FS_2$. Each file-set $FS_i$ is associated with a distance metric obtained from the various metadata fields involved, which indicates the similarity of files with respect to their relevance values. At the beginning of the iterative message-passing algorithm (iteration 0), the distributions of the relevance value probabilities are initialized to delta functions for the labeled files and to uniform distributions for the unlabeled files, as evoked earlier. At each iteration, probability distributions are sent to the file-set nodes. Following a computation at each file-set node using the messages received and the distance metric associated with that file-set node, the results of the computation are sent back as messages to the file nodes. The algorithm can already be stopped after one iteration, providing a rough estimate of the relevance distributions for the unlabeled files, or it can be continued for a number of iterations. Eventually, modified probability distributions are obtained (more or less centered on a given value, indicative of the relevance of the files), from which relevance values can be obtained, as seen in FIG. 3 (iteration n).

Figure 4:
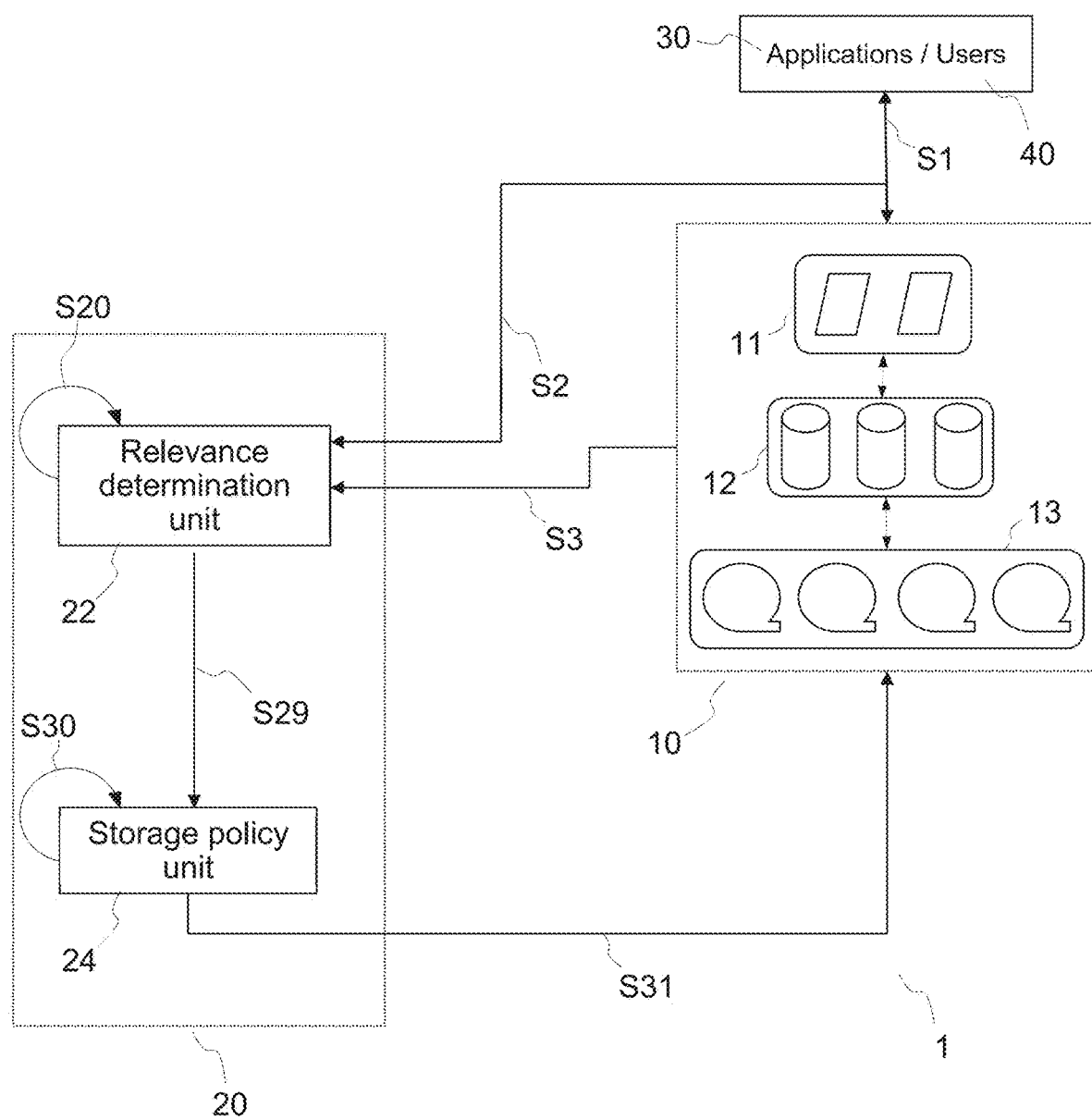
FIG. 4 schematically represents a storage system, comprising a relevance determination unit and a management unit, suited for implementing method steps as involved in embodiments of the invention.

The present schemes all rely on labeled datasets 51, i.e, a training set, which may be obtained thanks to inputs of a user 40 (or users), or, even, applications 30. Referring to FIG. 4, embodiments of the present methods may accordingly include (prior to determining the probability distributions) steps aiming at rating datasets 51 selected for the training. For example, as assumed in FIG. 4, user ratings may be received at step S2 by the relevance determination unit 22, based on which the needed probability distributions may subsequently be computed S20. As said earlier, only a small fraction of the datasets is typically needed to train the system, e.g., less than 1% or 0.1% of the total number of datasets in the storage system 1.

As further seen in FIG. 4, once relevance values have been obtained S20, e.g., for files as identified at steps S2 or S3 (i.e., as per exchanges with the applications/users or the storage units 10), a suitable storage management policy may be invoked by unit 24, which takes the determined relevance values as input S29. As a result, this storage management policy may notably instruct S31 to store, duplicate, garbage collect, etc., the datasets 51, 52 across storage tiers 11-13 of the storage system 1, based on their associated relevance values. This includes the initial datasets 51 (those of the training set, which have been initially rated) and, all the more, the unlabeled datasets 52, for which relevance values were automatically determined S20. Statistics as to the distribution of relevance values may further be aggregated and maintained, in order to design suitable storage management policies for the storage system 1. In addition, the management policy may be context-dependent, as evoked earlier.

Figure 5:
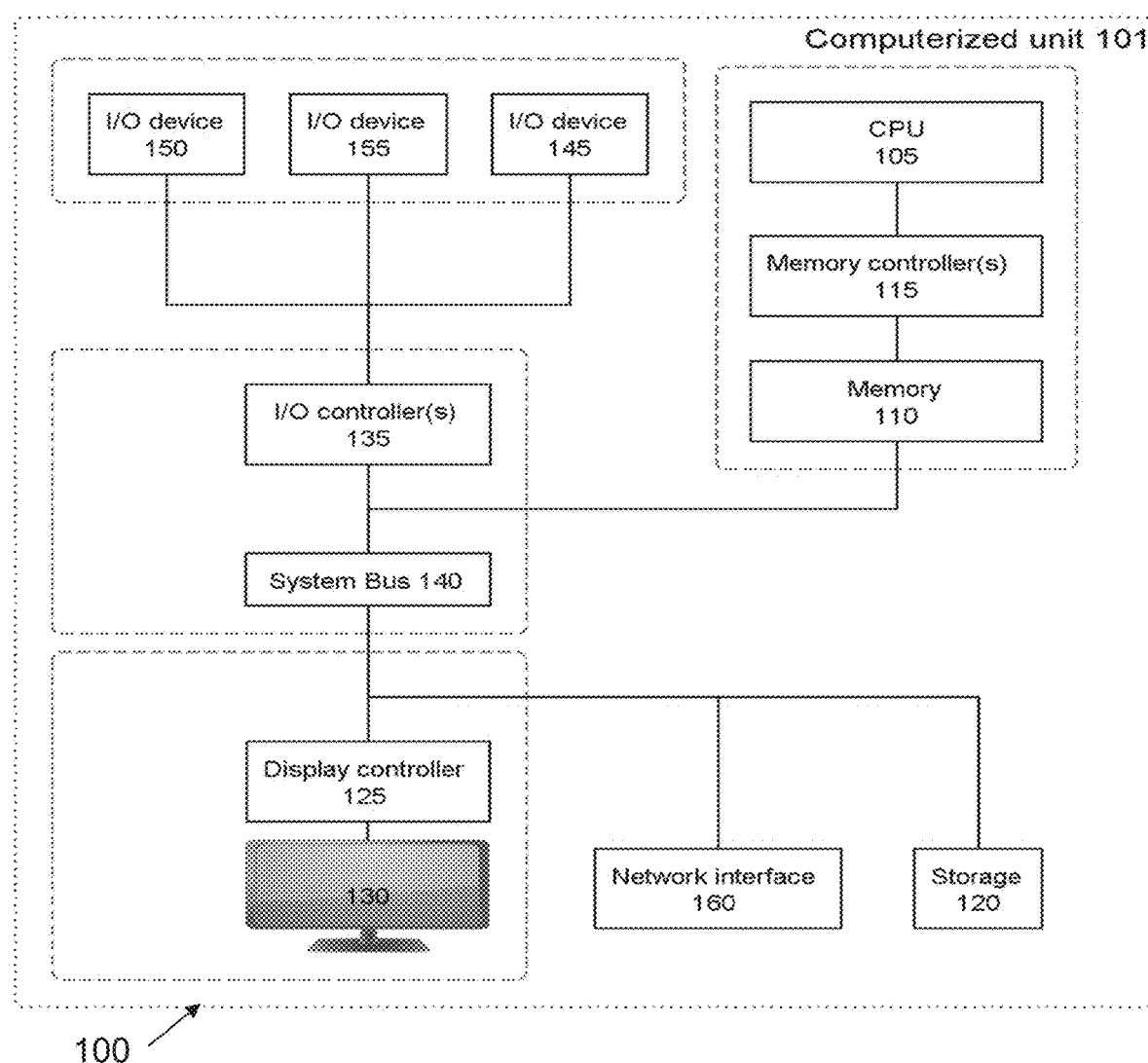
FIG. 5 schematically represents a general purpose computerized system, suited for implementing one or more method steps as involved in embodiments.

Referring now to FIGS. 4, 5, another aspect of the invention is briefly described, which concerns the storage system 1 itself. As explained earlier, the system comprises a relevance determination unit 22. Consistently with principles underlying the present invention, the unit 22 is configured to determine S20, for each unlabeled dataset 52, a respective probability distribution over a set of relevance values, which, in turn, allows a corresponding relevance value to be obtained. As discussed above, the probability distributions are computed based on distances, in terms of metadata values, between the datasets 51, 52.

The system also includes a management policy unit 24, configured to manage S30 datasets 51, 52 in the storage system 1, based on the relevance values as determined by the unit 22. As said above, the management policy unit 24 may notably be designed to store datasets 51, 52 across storage tiers 11-13 of the storage system 1, according to a storage management policy that precisely depends on the relevance values determined S20 for the datasets 52.

In the example of FIG. 4, the storage units 10 comprise three tiers 11-13 of storage. More generally though, the system may comprise two tiers, or more than three tiers of storage. A tiered storage system is known per se. A tier is typically defined as a homogenous collection of storage devices of a same kind, having all similar (if not identical) storage characteristics. Typically yet, the system will involve three tiers of storage. For instance, the units 10 depicted in FIG. 4 involves SSD devices 11 (first tier), high-end disks 12 (second tier), and tape drives 13 (third tier). Yet, additional tiers could be involved, e.g., low-end disks could be used in an intermediate tier between tiers 12 and 13.

The datasets considered here can be any consistent set of data, whose granularity may range between, e.g., data blocks (i.e., physical records, having a given, maximum length) and files (i.e., collections of blocks or file fragments), or collections of files. More generally, it may be any sequence of bytes or bits, or file fragments, having a predefined format or length.

The datasets stored across the tiers are likely to be accessed by one or more applications 30 as the latter interact S1 with the storage units 10. By interacting with the units 10, applications 30 consume data as input, which input data need be fetched from the storage units 10, and also produce new data, which may need be stored on the units 10. Thus, new datasets may constantly appear, which may need be rated S20 according to methods as discussed herein, whence the advantage of learning techniques.

Next, according to a final aspect, the invention can also be embodied as a computer program product. The latter will typically be a computer readable storage medium having program instructions embodied therewith, which instructions are executable by one or more processors, e.g., of a unit 101 such as depicted in FIG. 5, to implement functions of a unit 22, 24 such as described above.

The above embodiments have been succinctly described in reference to the accompanying drawings and may accommodate a number of variants. Several combinations of the above features may be contemplated, as exemplified below.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Example embodiments rely on graph-based, semi-supervised learning methods, which can achieve high estimation accuracy with few training samples.

Consider a system with files denoted by $f_i$, i=1, ..., N. For each file, $f_i$, any information about the file that can be observed by the system 1 can be considered as part of its metadata. This includes both content-dependent information and context-dependent information. Content-dependent metadata depends directly on the content of the file and can only change if the content changes. Examples of content-dependent metadata include:

File-system metadata like path, owner, date created, etc.; and

Metadata specific to certain types of files, e.g., camera model, aperture, focal length and so on for photos, artist, album, genre and so on, for music files, and, e.g., primary investigator, declination, right ascension and so on, for radio astronomy files.

In contrast to content-dependent metadata, context-dependent metadata depends on how the external world interacts with the file. Examples of context-dependent metadata include:

The users/applications accessing the file, e.g., the number of times each user has accessed the file in a given time window;

The publications that refer to the radio telescope observation data contained in a file Current location of the file, e.g., on-premise or cloud, SSD, HDD, or tape; and External knowledge-bases, e.g., social-media trends related to information contained in a file.

Context-dependent metadata can change over time even if the content of the file remains the same. Although context-dependent metadata also indirectly depends on the content, it depends, more importantly, on how the external world (i.e., users, applications, and systems) perceives and interacts with this content (e.g., the same file may be perceived relevant by one user but irrelevant by another) and therefore provides additional information that can be used to assess data relevance.

The metadata of a file f can be represented by an arbitrary set of key-value pairs, i.e., $\{(k_1(f), v_{k1}(f)), (k_2(f), v_{k2}(f)), \ldots \}$. The following notation will be used to represent its metadata and relevance:

K(f): the set of all metadata fields (keys) that can be observed for file f;

K(F): the set of all metadata fields (keys) that can be observed for all files in a set F;

$$K(F) = \bigcup_{f \in F} K(f) \quad (1)$$

$v_k$: metadata value corresponding to the metadata field k;
$V_k(f)$: the set of all metadata values corresponding to the metadata field k that can be observed for file f;

$$V_k(f) = \{v_k^{(1)}(f), v_k^{(2)}(f), \ldots, v_k^{(|V_k(f)|)}(f)\} \quad (2)$$

If $k \notin K(f)$ then $V_k(f) = \emptyset$. For single-valued metadata fields, the set comprises only one value per file;

$V_k(F)$: the set of all metadata values corresponding to the metadata field k for all files in a set F;

$$V_k(F) = \bigcup_{f \in F} V_k(f) \quad (3)$$

R(f): the relevance of file f expressed as a value from a finite set of values, e.g., $\{1, 2, \ldots, 10\}$ or $\{$"highly relevant", "relevant", "less relevant", "irrelevant"$\}$. Of course, many variants are possible. As subjective as they may appear, such values nevertheless define a set of distinct values, which subsequently impact the way the files are managed;

$N_R$: number of relevance classes in the system (each relevance class corresponds to one relevance value);

$P_R(f)$: probability distribution function of the relevance of file f over the set of $N_R$ relevance classes. This is a delta function for files 51 for which the relevance is assigned during training, as noted in sect. 1; and $F_{train}$: set of files used for training.

Note that the metadata fields and their values can be defined in many different ways and that the values can also be sets. This allows for sufficient flexibility in choosing the metadata that is relevant for different types of files, e.g., information about artist, album and genre may be relevant for music but not for photos.

In terms of the above formulation, a context C is defined as a set of metadata fields, K(C), where each of these metadata fields can take values in a certain set, $V_k(C)$, $\forall k \in K(C)$. Below are a few examples of contexts:

All photos taken during a vacation. In this case, the metadata fields of interest could be the file extension, which could take values .jpg, .jpeg, etc., the date created, which could take values that correspond to the vacation period, and geolocation, which could take values that correspond to the locations visited during the vacation.

All files belonging to a project. In this case, the metadata fields of interest could be the file path, which could take values corresponding to the folders in which the project files are located, file owners, which could take values corresponding to the people involved in the project, document keywords, which could take values corresponding to project related keywords.

As can be seen, a very large number of contexts can be defined depending on the metadata fields and the range of values they can take.

Although the above formulation allows flexibility, it may also present some challenges in designing a suitable learning algorithm.

Different sets of metadata fields. Defining a distance between two files requires that we have the same set of metadata fields available for both files. If two files share a subset of their metadata fields, this subset can be used to define a partial distance. The remainder of the metadata fields may need be handled separately (e.g., using logistic regression) to obtain another partial distance and then combined with the aforementioned distance to obtain a complete distance measure. In some cases, e.g., the distance between a music file and a photo, the subset of common metadata fields may be too restrictive and perhaps irrelevant for the purpose of determining a distance. In such cases, we need not one but multiple distance metrics to treat data of different types of files.

Selecting samples to send to user for training. In practice, the files need be sampled and sent to the user to obtain relevance labels. However, if the samples were selected uniformly randomly, it may happen that all the files sampled are of one type only (e.g., all music files or all photos) or that all files are of similar relevance.

Multiple values per metadata field. Distance metrics can be defined assuming a single value per metadata field. For instance, for a given metadata field k, the partial distance between two files having two different values $v_k(f_1)$ and $v_k(f_2)$ can be computed as a symmetric divergence measure (e.g., Jensen-Shannon divergence) between the conditional probability distributions $P(R|(k, v_k(f_1)))$ and $P(R|(k, v_k(f_2)))$, where these distributions are obtained empirically from the training samples. This may be extended to cases where there may be multiple values associated with a metadata field of a file. One possible method is to define the partial distance between two files having two sets of values $\{v_{k,1}(f_1), v_{k,2}(f_1), \ldots\}$ and $\{v_{k,1}(f_2), v_{k,2}(f_2), \ldots\}$, as a symmetric divergence measure between conditional probability distributions $P(R|(k, \{v_{k,1}(f_1), v_{k,2}(f_1), \ldots\}))$ and $P(R|(k, \{v_{k,1}(f_2), v_{k,2}(f_2), \ldots\}))$. This may further be simplified by using conditional independence assumptions as used in the naïve Bayes model.

File-sets. To address the first challenge, we introduce the notion of supersets, here assumed to be file-sets. Given a set of keys (metadata fields) K, a file-set, $F_q(K)$, with respect to K with parameter q is defined as the set of all files in the system that have at least a fraction q of the keys in K.

$$F_q(K) = \{f : |K(f) \cap K|/|K| \geq q\}, 0 \leq q \leq 1. \quad (4)$$

We use the notion of file-sets to scan all the files in the system and the metadata corresponding to them to identify the different types of files in the system (e.g., music files, photos, documents, etc.), assuming a fixed parameter q. Thus, we obtain a file-set for each type of file. Note, however, that a file-set could also be defined by a user, e.g., by choosing a set of metadata fields and a value for the parameter q.

The notion of file-sets can be extended to context-dependent file-sets. A context-dependent file-set $F_q(C)$ with respect to context C with parameter q is defined as the set of all files that have at least a fraction q of the metadata fields in the context, K(C), and have the values of the corresponding fields within set of values, $V_k(C)$, defined by the context.

$$F_q(C) = \{f : |K(f) \cap K|/|K| \geq q \text{ and } v_k(f) \in V_k(C) \forall k \in K(f) \cap K\}. \quad (5)$$

Now, suppose that we have $N_{FS}$ file-sets denoted by $FS_i$, $i=1, \ldots, N_{FS}$, as in FIG. 3 (where $N_{FS}$ is equal to 2 in this simple example). These could be automatically obtained, user-defined, or even context-dependent. Regardless of how they are obtained, for values of the parameter q close to one, we have the desirable property that each file in a file-set has a significant number of common metadata fields with all other files in the same file-set. This allows us to define suitable distance metrics, $D_{FSi}$, over the set of keys in each file-set, $FS_i$. The weights associated with the different metadata fields in a distance metric can for instance be learned by training data with files from that file-set. The notion of file-sets also allows for a more effective sampling of files for training. In particular, instead of sampling uniformly from all the files in the system, we can now sample uniformly from each of the different file-sets, e.g., we could sample a few music files and a few photos as they are likely to belong to different file-sets.

Consider a file-set with m metadata fields for which a distance-metric is to be defined. Let $P_{ij}(R)$, $i=1, \ldots, m, j=1, \ldots, m_i$, denote the conditional probability distributions of the relevance R given that the ith metadata field, $k_i$, has the value j, that is, $$P_{ij}(R) = P(R | v_{ki} = j), i=1, \ldots, m, j=1, \ldots, m_i. \quad (6)$$

Let $d_i(j, j')$ denote the distance between a metadata field, $k_i$, of two files taking the values j or j'. Let the Kullback-Leibler divergence between two probability distributions P and Q be denoted by $d_{KL}(P\|Q)$:

$$d_{KL}(P\|Q) = \sum_i P(i) \log \frac{P(i)}{Q(i)} \quad (7)$$

Some possible choices for $d_i(j, j')$ are given below.
Symmetrized Kullback-Leibler Divergence.

$$d_i(j,j') = d_{KL}(P_{ij}\|P_{ij'}) + d_{KL}(P_{ij'}\|P_{ij}) \quad (8)$$

λ-Divergence. For $0 < \lambda < 1$, $$d_i(j,j') = \lambda d_{KL}(P_{ij}\|\lambda P_{ij'} + (1-\lambda)P_{ij'}) + (1-\lambda)d_{KL}(P_{ij'}\|\lambda P_{ij} + (1-\lambda)P_{ij'}). \quad (9)$$

Jensen-Shannon Divergence. λ-Divergence with λ=0.5. The Jensen-Shannon divergence is bounded by 1 for two probability distributions (given that one uses the base 2 logarithm) and 0 because mutual information is non-negative.

$$0 \leq d_i(j,j') \leq 1 \quad (10)$$

Now, the distance between two files $f_x$ and $f_y$ with metadata values $v_{ki}(f_x) = x_i$ and $v_{ki}(f_y) = y_i$, $i=1, 2, \ldots, m$, can be defined as a linear combination of the distances between the metadata values of the two files, $d_i(x_i, y_i)$, using parameters $\alpha = (\alpha_1, \ldots, \alpha_m)$, $\alpha_i \leq 0$, as follows:

$$D_\alpha(f_x, f_y) = \sum_{i=1}^{m} \alpha_i d_i(x_i, y_i) \quad (11)$$

If this distance is to be a good estimator of difference in relevance, then the $D_\alpha(f_x, f_y)$ must typically be a monotonically increasing function of the absolute difference of their relevance, $|R(f_x) - R(f_y)|$. For example, $$D_\alpha(f_x, f_y) \propto |R(f_x) - R(f_y)|, \quad (12)$$

or $$D_\alpha(f_x, f_y) \propto e^{|R(f_x) - R(f_y)|}. \quad (13)$$

Given a set of files for training, $F_{train}$, whose metadata values as well as relevance are known, the parameters α can be obtained by minimizing the mean squared-difference between $D_\alpha(f_x, f_y)$ and $\gamma |R(f_x) - R(f_y)|$ (or $\gamma e^{|R(f_x) - R(f_y)|}$):

$$\operatorname*{argmin}_{\alpha, \gamma} \sum_{f_x \in F_{train}} \sum_{f_y \in F_{train}} (D_\alpha(f_x, f_y) - \gamma |R(f_x) - R(f_y)|)^2, \quad (14)$$

s.t., $\alpha_i, \gamma > 0 \forall i$, or $$\operatorname*{argmin}_{\alpha, \gamma} \sum_{f_x \in F_{train}} \sum_{f_y \in F_{train}} (D_\alpha(f_x, f_y) - \gamma e^{|R(f_x) - R(f_y)|})^2, \quad (15)$$

s.t., $\alpha_i, \gamma > 0 \forall i$.

The above are linear programming problems, solving which yields the required values of α and hence the distance metric between files $D_\alpha$.

The exponential definition of relevance is preferably chosen. This is because, for files from the same class, the difference $|R(f_x) - R(f_y)|$ is equal to 0. Moreover, the divergence measure for the identical distributions is also zero. Therefore, taking into account the constraint $\alpha_i, \gamma > 0$ the linear programming problem is flattened and has multiple local minima, which was also observed in practice. Therefore, an alternative definition is similarity metric using the Jensen-Shannon divergence for $d_i(j, j')$:

$$S_\alpha(f_x, f_y) = \sum_{i=1}^{M} \alpha_i (1 - d_i(x_i, y_i)). \quad (16)$$

The similarity between two files increases with more common meta-data values and equal to 0 in case of total non-similarity. The γ parameter can also be placed differently:

$$\gamma e^{|R(f_x)-R(f_y)|} \quad (17)$$

$$e^{\gamma|R(f_x)-R(f_y)|} \quad (18)$$

$$e^{|R(f_x)-R(f_y)|} \quad (19)$$

As a result, the linear programming problem has one global minimum. Experiments on datasets show that the best accuracy is achieved by setting the parameter γ equal to one, as in Eq. (19).

Metric learning. Solving the linear programming problem defined above is crucial for obtaining the required values of α. The α parameters define the influence of every metadata field on the distance between files and thus on determining the relevance.

There exist several methods in the literature for solving linear programming problems with bounded constraints. One of them is the trust region reflective method, which is robust for many unbounded and bounded constraint problems and is chosen as a default algorithm for minimization problem in many frameworks. However, there are scalability and performance issues with this approach. Therefore, another well-known algorithm for parameter estimation, called Limited-memory BFGS or L-BFGS, is preferably used. It is an optimization algorithm of the family of quasi-Newton methods to solve the optimization unbounded problems of the form $\min_{\omega \in R^d} f(\omega)$. The method approximates the objective function locally as a quadratic one and does not require to calculate the second partial derivatives for constructing the Hessian matrix which is approximated by previous gradient evaluations. As a result, L-BFGS achieves rapid convergence in comparison with trust region reflective method and is scalable. For the results presented here, the L-BFGS-B algorithm, a variation of the L-BFGS algorithm for bounded constrained optimization is used. The LBFGS algorithm is used for training logistic regression models considered in the results.

Closest neighbor rule (CNR). The relevance of a new file $f_z$ can then be estimated using the learned distance metric or similarity metric as follows:

$$R(f_z) = R(f_x^*), \quad (20)$$
where $f_x^* = \underset{f_x \in F_{train}}{\operatorname{argmin}} D_\alpha(f_x, f_z)$.

$$R(f_z) = R(f_x^*), \quad (21)$$
where $f_x^* = \underset{f_x \in F_{train}}{\operatorname{argmax}} S_\alpha(f_x, f_z)$.

The closest neighbor rule approach is iterating over the whole training set for estimating the relevance of each file, which may not be the most efficient. Moreover, this makes it rather difficult to parallelize the computation because we need to broadcast the whole training set to all nodes in the computing cluster.

Clusteroids (CL-ζ). As a solution, an alternative approach using the notion of clusteroids may preferably be used. For each relevance class r in the system, $r=1, \ldots, N_R$, its clusteroid $h(r)$ is defined as the file belonging to the relevance class with the least sum of distances (or highest sum of similarity) to all other files in that relevance class. Let $F(r) \subset F_{train}$ denote the set of files in relevance class r. Then, $$h(r) = \underset{f_x \in F(r)}{\operatorname{argmin}} \sum_{f_y \in F(r)} D_\alpha(f_x, f_y), r = 1, \ldots, N_R \quad (22)$$

or $$h(r) = \underset{f_x \in F(r)}{\operatorname{argmax}} \sum_{f_y \in F(r)} S_\alpha(f_x, f_y), r = 1, \ldots, N_R \quad (23)$$

Now, instead of iterating through the entire training set as in the CNR approach, we may instead iterate over the clusteroids of each relevance class.

The notion of clusteroids can also be extended to clusteroid sets, e.g., by selecting a certain number of files from each relevance class with the smallest sums of distances (or highest sums of similarity) to all other files in the same relevance class. The number of files selected from each relevance class to form the clusteroid set is a parameter ζ that can be configured. A clusteroid set for relevance class r, denoted by $H(r)$, is given by $$H(r) = \{h_1(r), h_2(r), \ldots, h_{|H(r)|}(r)\}, \quad (24)$$

where $h_i(r)$ are obtained as follows:

$$h_i(r) = \underset{f_x \in F_i(r)}{\operatorname{argmin}} \sum_{f_y \in F_i(r)} D_\alpha(f_x, f_y), \quad (25)$$
$$r = 1, \ldots, N_R, i = 1, \ldots, |H(r)|$$

or $$h_i(r) = \underset{f_x \in F_i(r)}{\operatorname{argmax}} \sum_{f_y \in F_i(r)} S_\alpha(f_x, f_y), \quad (26)$$
$$r = 1, \ldots, N_R, i = 1, \ldots, |H(r)|$$

and $F_i(r)$ are defined as follows:

$$F_1(r) = F(r) \quad (27)$$

$$F_i(r) = F(r) \setminus \{h_1(r), \ldots, h_{i-1}(r)\}, i=2, \ldots, |H(r)| \quad (28)$$

Note that the set of clusteroids may also be obtained using other criteria. Let H denote the union of all the clusteroid sets, that is, $$H = \bigcup_{r=1}^{N_R} H(r) \quad (29)$$

Then, the relevance of a new file $f_z$ can be estimated as:

$$R(f_z) = r^*, \quad (30)$$
where $r^* = \underset{r}{\operatorname{argmin}} \sum_{h(r) \in H(r)} \frac{D_\alpha(h(r), f_z)}{|H(r)|}$ or $$R(f_z) = r^*, \qquad (31)$$

$$\text{where } r^* = \underset{r}{\arg\max} \sum_{h(r) \in H(r)} \frac{S_a(h(r), f_z)}{|H(r)|}.$$

Unseen and missing metadata values. There may be cases when the ith metadata field, $k_i$, of a file $f_z$ takes a value j that has not been observed in the training set. This implies that the corresponding empirical conditional probability distribution of the relevance metric, namely, $P(R|v_{ki}=j)$, is not available. Similarly, there may be cases where the value corresponding to a particular metadata field is not available. In such cases, the conditional probability can be assumed to be uniform over the relevance values. However, using a uniform distribution may not perform well in all cases, especially for files which do not have values for many metadata fields. Moreover, the presence of multiple metadata values for a single metadata field will also need to be addressed.

To address these issues, in embodiments, the set of metadata fields in the training set, $K(F_{train})$, can be split into two sets:

A set, $K_q(F_{train})$, which consists of keys that are present in at least a fraction q of all files and can have only a single value; and A set, $K_z(F_{train})=K(F_{train})\setminus K_q(F_{train})$, which consists of keys that are not present in at least a fraction q or that can have more than one value.

The second set, $K_z(F_{train})=\{k_1, k_2, \ldots, k_{|K_z(Ftrain)|}\}$, is typically small for high values of q because it consists of rare keys. Based on this set we construct a vector M of key-value pairs as follows:

$$M = ((k_1, V_{k_1}(F_{train})), \qquad (32)$$
$$(k_2, V_{k_2}(F_{train})), \ldots, (k_{|K_z(F_{train})|}, V_{|K_z(F_{train})|}(F_{train})))$$

where $$V_{k_i}(F_{train}) = \{v_{k_i}^{(1)}, v_{k_i}^{(2)}, \ldots, v_{k_i}^{(|V_{ki}(Ftrain)|)}\}$$

denotes the set of all values observed in the training set for metadata field $k_i$. Here, $(k_i, V_{ki}(F_{train}))$ is used as shorthand for $$(k_i, v_{k_i}^{(1)}), (k_i, v_{k_i}^{(2)}), \ldots, (k_i, v_{k_i}^{(|V_{ki}(Ftrain)|)}).$$

The length of this vector, denoted by L, is equal to the sum of the number of values seen for each metadata field in the $K_z(F_{train})$:

$$L = \sum_{f \in F_{train}} |V_k(f)| \qquad (33)$$

The vector M can now be used to define a feature space X of dimension L, where each file f is represented by a row vector $x(f) \in X$ as follows:

$$x(f) = (x_1(f), x_2(f), \ldots, x_L(f)), \qquad (34)$$
where $$x_i(f) = \begin{cases} 1, & \text{if the ith key-value pair in } M \text{ is present in file } f \\ 0, & \text{otherwise} \end{cases} \qquad (35)$$

The features as defined above may be used as input for a learning algorithm that focuses on the key set $K_z(F_{train})$. Multinomial logistic regression, the generalized version of binary logistic regression that is widely used for multiclass classification problems, is preferably used as the learning algorithm. As we have $N_R$ relevance classes, one of the outcomes can be chosen as a pivot, and the other $N_R-1$ classes can be separately regressed against the pivot outcome. The most relevant class is preferably chosen as the pivot class. As a result, the algorithm will output a multinomial logistic regression model, which contains $N_R-1$ binary logistic regression models regressed against the first class, which is chosen as the pivot, with loss functions Loss defined as follows:

$$\text{Loss}_i(w_i, x(f), R(f)) = \log(1 + \exp(-R(f) \times x(f) w_i^T))$$
$$i = 1, \ldots, N_R - 1 \qquad (36)$$

Here, X is a $|F_{train}| \times L$ feature matrix constructed as follows:

$$X = \begin{bmatrix} x(f_1) \\ x(f_2) \\ \vdots \\ x(f_{|F_{train}|}) \end{bmatrix}, f_i \in F_{train} \forall i \qquad (37)$$

And $w_i$ is a row vector of length L containing weights, which are real numbers that correspond to the ith logistic regression model.

Given a new file f, its corresponding feature vector $x(f)$ can be constructed based on M as described above. The estimation of relevance class is made by applying the logistic functions, $g_i(f)$, which are defined as follows:

$$g_1(f) = 0.5 \qquad (38)$$

$$g_i(f) = \frac{1}{1 + \exp(-w_i x^T(f))}, i = 2, \ldots, N_R \qquad (39)$$

The class with the largest value of the logistic function is chosen as the estimated class.

Given two files $f_x$ and $f_y$, and their estimated classes $R(f_x)$ and $R(f_y)$ based on applying multinomial logistic regression on the values of metadata fields $K_z(F_{train})$, a vector $\xi(f_x, f_y) = (\xi_1, \ldots, \xi_{N_R})$ of length $N_R$ is constructed as follows:

$$\xi_i = \begin{cases} 1, & \text{if } R(f_x) = R(f_y) = i \\ 0, & \text{otherwise} \end{cases}, \qquad (40)$$
$$\text{for } i = 1, \ldots, N_R$$

To obtain a combined distance metric based on the values of both sets of metadata fields, $K_q(F_{train})$ and $K_z(F_{train})$, we introduce parameters $\beta_i$, $i=1, \ldots, N_R$, and form a linear combination as follows:

$$D_{\alpha,\beta}(f_x, f_y) = \sum_{i=1}^{|K_q(F_{train})|} \alpha_i d_i(x_i, y_i) + \sum_{i=1}^{N_R} \beta_i \xi_i. \quad (41)$$

In a similar manner, a combined similarity metric can be obtained. Logistic regression models have a direct probabilistic interpretation for the raw model outputs $g_i(f)$. This is the main reason why logistic regression is here preferred over other models such as support vector machines.

Additionally, some other aspects can be considered for improving the generalization of the model, convergence time, and accuracy. A relatively important aspect is the regularization type which is used to avoid overfitting. The following two regularizers were tested for the logistic regression model:

$$L1 = \|W\| \quad (42)$$

$$L2 = \frac{1}{2}\|W\|_2^2 \quad (43)$$

Moreover, the model is preferably run with activated bias features and L2 regularizer in Eq. (43), for which the results are presented.

Updating the feature space for logistic regression. Logistic regression requires retraining on the updated feature space when new metadata fields and values are observed when more files are added to the training set. To solve this issue the concepts of streaming logistic regression and extended feature space can be used. In streaming logistic regression fitting occurs on each batch of data and the model continually updates to reflect the data from the stream. Extended feature space is inspired by dynamic array allocation in programming languages. We create the feature space with capacity bigger than we need during the training. For example, if the vector M has length 20 based on a given training set $F_{train}$, a capacity to accommodate up to, for example, 40 features is chosen and the feature vectors $x(f)$ will be padded with zeros to achieve this extended length. An important observation here is that the padded zero values will not influence model accuracy. When more files are added to the training set, the vector M is updated with newly found key-value pairs, if any.

If the capacity of the feature space is exceeded, then the following steps can be taken:

Create a new bigger feature space. In practice, we can extend the current feature space, by padding the existing feature vectors $x(f)$ with additional zeros;

Create a new model and initialize it with new length of weight vector equal to the length of feature space from previous step; and Train model on a few previous batches.

For every file-set we have suitable distance metrics and a corresponding streaming linear regression model. The unseen metadata values occur much more rarely within a given file-set. The concept of extended feature space allows to keep the model up-to-date over long periods of time.

Experiments were performed on an Apache Spark™ cluster which consists of four worker nodes each of which was running two executors. Each executor has 3 GB of RAM and 2 CPU cores. The driver node has 6 GB of RAM and 2 CPU cores. Two datasets were considered.

For a given set of files, a distance (or similarity) learning method was used, which divides the set of metadata fields into a set of common single-valued fields and a set of uncommon multi-valued fields, and defines a parameterized distance metric for each of these sets. The two metrics are combined and the parameters are learned using training data, according to principles discussed in sect. 2.2. When used on sets of files that share a large number of metadata fields, this method significantly reduces the number of parameters required to learn distances, while maintaining or surpassing the accuracy of other methods such as logistic regression that employ a far greater number of parameters. Thus, the proposed learning method allows faster learning and is robust against overfitting. Moreover, the proposed method can be applied to different supersets, which represent various contexts, to learn a distance metric for each context. This paves the way for an efficient graph construction, allowing graph-based algorithms for estimating data relevance across multiple contexts.

Consider a heterogeneous bipartite graph as shown in FIG. 3 with two types of vertices, which are used to represent the file-sets and files, respectively. Each file is connected to all the file-sets to which it belongs. Each file-set $FS_j$ is associated with its distance metric $D_{FSj}$. Each file $f_i$ is associated with its metadata fields, $K(f_i)$, the corresponding values, $V(f_i)$, and its probability distribution over the set of relevance values, $P_R(f_i)$.

Learning of relevance is based on a message-passing algorithm, where probability distributions over relevance values are passed as messages along the edges of the graph. At the beginning, $P_R(f_i)$ are initialized to delta functions for the labeled files and to uniform distributions for the unlabeled files, as shown in FIG. 3. In each iteration, these probability distributions are sent to the file-set nodes. Following a computation at each file-set node using the messages received and the distance metric associated with that file-set node, the results of the computation are sent back to the file nodes. The algorithm can be stopped after one iteration, providing an estimate of the relevance distributions for the unlabeled files, or can be continued for a fixed number of iterations.

A preferred way to compute the message $P_R(f)$ to be sent to each file f connected to a file-set FS is as follows:

$$P_R(f) = \frac{\sum_{f' \in FS\setminus\{f\}} P_R(f')/D_{FS}(f, f')}{\sum_{f'' \in FS\setminus\{f\}} 1/D_{FS}(f, f'')}. \quad (44)$$

In other words, the above distribution is a weighted average of the distributions received at the file-set node FS (and pertaining to other datasets of said file-set FS), with weights equal to the inverse of the distance between files.

To aggregate all the messages received at the file-nodes we simply multiply all the probability distributions sent from the nodes corresponding to all the file-sets to which the file belongs, together with the input distribution, and normalize the result.

Computerized devices can be suitably designed for implementing embodiments of the present invention as described herein. In that respect, it can be appreciated that the methods described herein are largely non-interactive and automated. In example embodiments, the methods described herein can be implemented either in an interactive, partly-interactive or non-interactive system. The methods described herein can be implemented in software (e.g., firmware), hardware, or a combination thereof. In example embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 1 and/or the units 10 depicted in FIG. 4 may, each, involve one or more computerized units 101, such as schematically depicted in FIG. 5, e.g., general-purpose computers. In example embodiments, in terms of hardware architecture, as shown in FIG. 5, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements (e.g., read-only memory). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 5, the software in the memory 110 includes methods described herein in accordance with example embodiments and a suitable operating system (OS). The OS essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices. In addition, the I/O devices 145-155 may further include devices that communicate both inputs and outputs. The system 10 can further include a display controller 125 coupled to a display 130. In example embodiments, the system 10 can further include a network interface or transceiver 160 for coupling to a network (not shown) and thereby interact with other, similar units 101, making up a system such as depicted in FIG. 4.

The network transmits and receives data between the unit 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In example embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
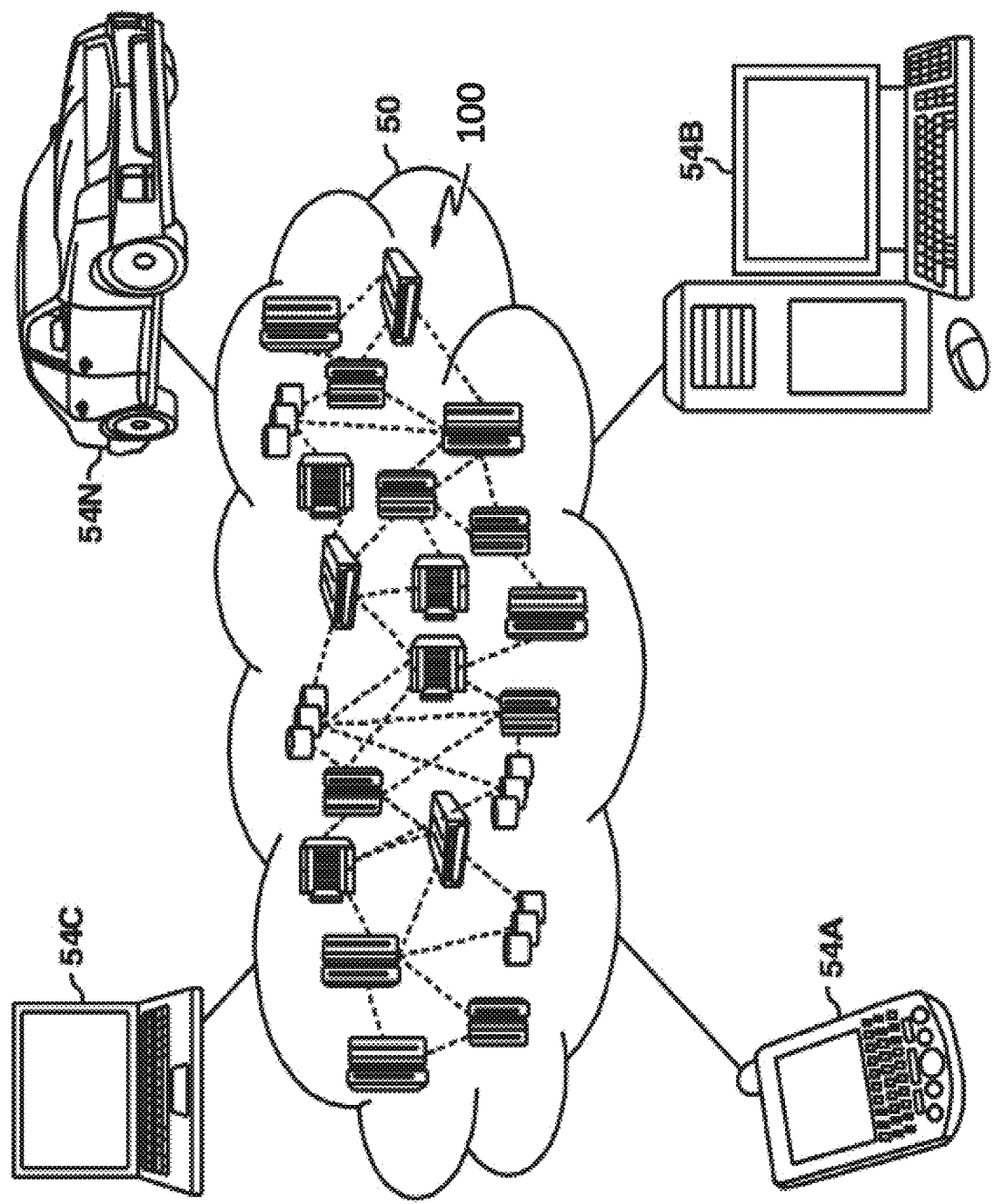
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
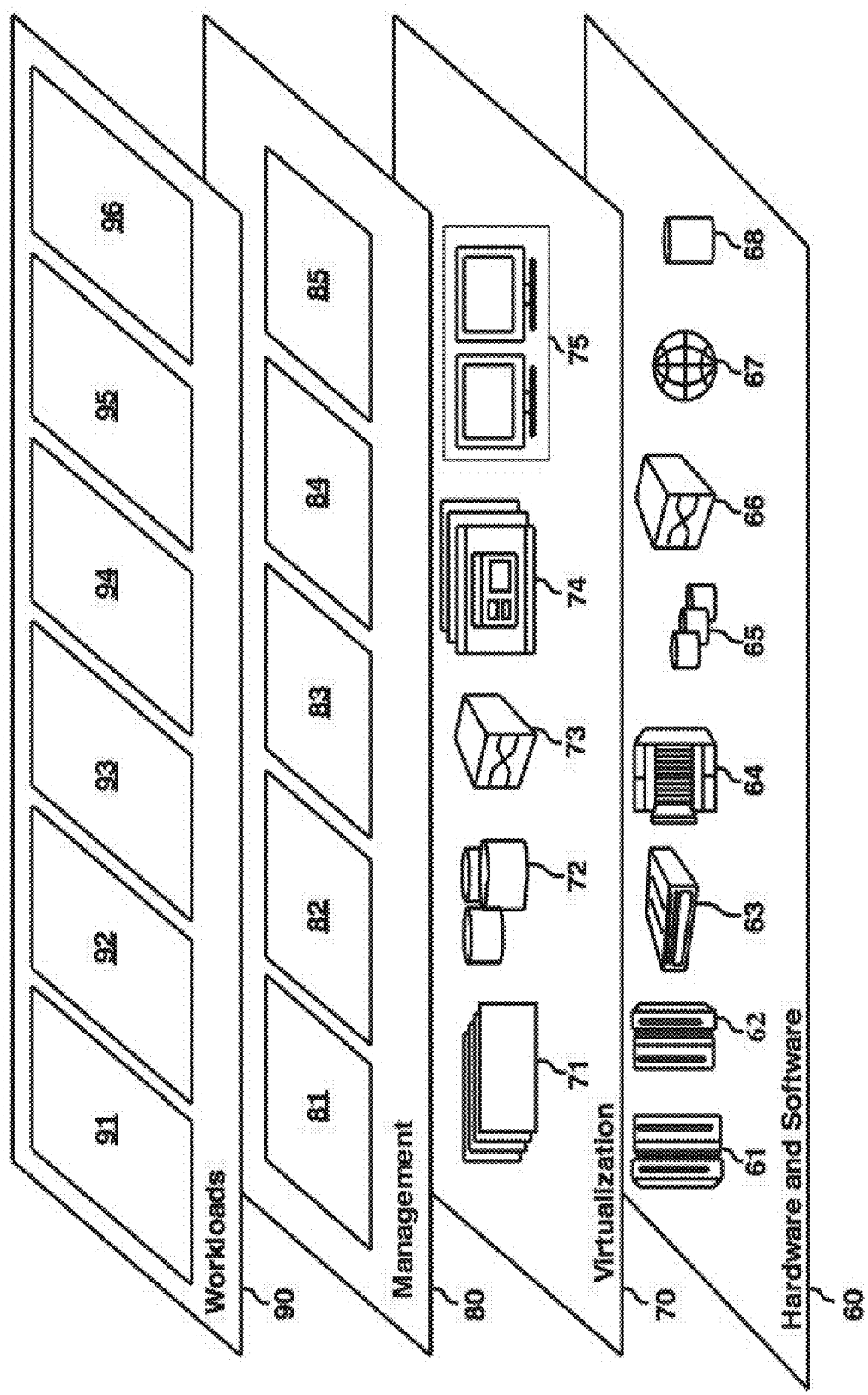
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dataset management system 96. Dataset management system 96 may relate to managing datasets across storage tiers of a storage system, based on their relevance.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A computer-implemented method for managing datasets in a storage system, wherein a subset of the datasets is labeled with respect to their relevance, so as to be associated with respective relevance values, the method comprising:
  defining supersets of the datasets, based on metadata available for the datasets;
  associating each of the datasets to at least one of the defined supersets by comparing metadata available for the each of the datasets with metadata used to define at least one of the supersets;
  determining, for each unlabeled dataset of the datasets, a respective probability distribution over a set of relevance values, to obtain a corresponding relevance value, wherein the respective probability distribution is computed based on distances, in terms of metadata values, between the each unlabeled dataset and the labeled datasets, and wherein the respective probability distribution is computed based on a sum of weighted initial probability distributions associated with other datasets of the datasets, and wherein an initial probability distribution of a given dataset is determined as a probability distribution over the relevance values, according to a relevance value associated with that given dataset, and wherein the sum of weighted initial probability distributions associated with the other datasets of the datasets is weighted according to inverse distances between the each unlabeled dataset and the other datasets, and wherein the respective probability distribution, as associated with the each unlabeled dataset, is determined based on a sum of weighted initial probability distributions associated with other datasets of the at least one of the supersets with which the each unlabeled dataset is associated, and wherein the respective probability distribution, as associated with the each unlabeled dataset, is determined based on several sums of weighted initial probability distributions associated with other datasets of the at least one of the supersets, as respectively obtained for several supersets of interest, with which the each unlabeled dataset is associated, and wherein distances between datasets of the each of the supersets of interest are computed according to a distance metric associated with each of the supersets of interest, respectively, and wherein the distance metric is determined based on metadata fields of the datasets of the each of the supersets of interest, and wherein the distance metric is determined based on common metadata fields shared by the datasets of the each of the supersets of interest, whereby a distance between two datasets f1, f2 is computed as a symmetric divergence measure between two conditional probability distributions $P(R|k, vk(f1))$ and $P(R|k, vk(f2))$, respectively pertaining to the two datasets f1, f2, and wherein a conditional probability distribution $P(R|(k, vk(f))$ is an empirical distribution of probability, obtained from the labeled datasets, of observing a given relevance value R when a file f has metadata values $vk(f)$ for a set of metadata fields k; and
  managing the datasets in the storage system based on their associated relevance values.

2. The computer-implemented method of claim 1, wherein computing the respective probability distribution, as associated with said each unlabeled dataset, comprises:
  for each of the supersets of interest, computing an auxiliary probability distribution over the set of relevance values, as a sum of weighted, initial probability distributions associated with all datasets but said each unlabeled dataset of said each of the supersets of interest, wherein the probability distributions are weighted according to inverse distances between said each unlabeled dataset and the other datasets of said each of the supersets of interest; and
  obtaining said respective probability distribution based on each auxiliary probability distribution computed for said each unlabeled dataset.

3. The computer-implemented method of claim 2, wherein obtaining said respective probability distribution further comprises, for each unlabeled dataset:
  multiplying all auxiliary probability distributions as obtained for each of the supersets of interest.

4. The computer-implemented method of claim 3, wherein initializing probability distributions comprises:
  associating a Dirac delta function to each labeled dataset, centered on the respective reference value; and
  associating a uniform distribution to each unlabeled dataset, this distribution being uniform over each of the relevance values.

5. The computer-implemented method of claim 2, wherein computing the probability distribution associated with said each unlabeled dataset further comprises:
  initializing probability distributions associated with datasets of each of the supersets of interest, to obtain initial probability distributions.

6. The computer-implemented method of claim 2, wherein the method further comprises, prior to determining relevance values for the unlabeled datasets:
  defining a heterogeneous bipartite factor graph having two types of nodes, wherein datasets and supersets are associated with a first type of nodes and a second type of nodes of the heterogeneous bipartite factor graph defined, respectively; and
  connecting each unlabeled dataset to at least one of the nodes of the second type of the heterogeneous bipartite factor graph defined, to associate each unlabeled dataset to at least one of the supersets, and wherein the probability distribution associated with each unlabeled dataset is computed by a message passing algorithm on the heterogeneous bipartite factor graph, whereby probability distributions are passed as messages along edges of the heterogeneous bipartite factor graph that connect pairs of nodes of different types in the heterogeneous bipartite factor graph.

7. The computer-implemented method of claim 6, wherein a message $PR(f)$ to be sent, at each iteration of the message passing algorithm, to each dataset f connected to a given one of the supersets is based on:

probability distributions associated with other datasets, which are also connected to said given one of the supersets; and distances between the datasets connected to said given one of the supersets.

8. The computer-implemented method of claim 1, wherein the method further comprises, prior to determining said respective probability distribution for said each unlabeled dataset:

receiving user ratings as to said subset of labeled datasets.

9. The computer-implemented method of claim 8, wherein said subset of the datasets comprises less than 1% of the datasets in the storage system.

10. The computer-implemented method of claim 1, wherein managing the datasets comprises:

storing the datasets across storage tiers of the storage system based on their relevance values.

11. A computer system for managing datasets, wherein a subset of the datasets is labeled with respect to their relevance, so as to be associated with respective relevance values, the computer system comprising:

one or more computer devices each having one or more processors and one or more tangible storage devices; and a program embodied on at least one of the one or more storage devices, the program having a plurality of program instructions for execution by the one or more processors, the program instructions comprising instructions for:

defining supersets of the datasets, based on metadata available for the datasets;

associating each of the datasets to at least one of the defined supersets by comparing metadata available for the each of the datasets with metadata used to define at least one of the supersets;

determining, for each unlabeled dataset of the datasets, a respective probability distribution over a set of relevance values, to obtain a corresponding relevance value, wherein the respective probability distribution is computed based on distances, in terms of metadata values, between the each unlabeled dataset and the labeled datasets, and wherein the respective probability distribution is computed based on a sum of weighted initial probability distributions associated with other datasets of the datasets, and wherein an initial probability distribution of a given dataset is determined as a probability distribution over the relevance values, according to a relevance value associated with that given dataset, and wherein the sum of weighted initial probability distributions associated with the other datasets of the datasets is weighted according to inverse distances between the each unlabeled dataset and the other datasets, and wherein the respective probability distribution, as associated with the each unlabeled dataset, is determined based on a sum of weighted initial probability distributions associated with other datasets of the at least one of the supersets with which the each unlabeled dataset is associated, and wherein the respective probability distribution, as associated with the each unlabeled dataset, is determined based on several sums of weighted initial probability distributions associated with other datasets of the at least one of the supersets, as respectively obtained for several supersets of interest, with which the each unlabeled dataset is associated, and wherein distances between datasets of the each of the supersets of interest are computed according to a distance metric associated with each of the supersets of interest, respectively, and wherein the distance metric is determined based on metadata fields of the datasets of the each of the supersets of interest, and wherein the distance metric is determined based on common metadata fields shared by the datasets of the each of the supersets of interest, whereby a distance between two datasets f1, f2 is computed as a symmetric divergence measure between two conditional probability distributions $P(R|k, vk(f1))$ and $P(R|k, vk(f2))$, respectively pertaining to the two datasets f1, f2, and wherein a conditional probability distribution $P(R|(k, vk(f))$ is an empirical distribution of probability, obtained from the labeled datasets, of observing a given relevance value R when a file f has metadata values vk(f) for a set of metadata fields k; and managing the datasets in the computer system based on their associated relevance values.

12. The computer system of claim 11, wherein managing the datasets in the computer system based on their associated relevance values further comprises program instructions to store the datasets across storage tiers of the computer system based on their corresponding relevance values.

13. A computer program product for managing datasets in a storage system, the computer program product comprising a computer readable storage medium having program instructions embodied therewith, the program instructions being executable by a computerized system to cause to:

define supersets of the datasets, based on metadata available for the datasets;

associate each of the datasets to at least one of the defined supersets by comparing metadata available for the each of the datasets with metadata used to define at least one of the supersets;

determine, for each unlabeled dataset of the datasets, a respective probability distribution over a set of relevance values, to obtain a corresponding relevance value, wherein the respective probability distribution is computed based on distances, in terms of metadata values, between the each unlabeled dataset and the labeled datasets, and wherein the respective probability distribution is computed based on a sum of weighted initial probability distributions associated with other datasets of the datasets, and wherein an initial probability distribution of a given dataset is determined as a probability distribution over the relevance values, according to a relevance value associated with that given dataset, and wherein the sum of weighted initial probability distributions associated with the other datasets of the datasets is weighted according to inverse distances between the each unlabeled dataset and the other datasets, and wherein the respective probability distribution, as associated with the each unlabeled dataset, is determined based on a sum of weighted initial probability distributions associated with other datasets of the at least one of the supersets with which the each unlabeled dataset is associated, and wherein the respective probability distribution, as associated with the each unlabeled dataset, is determined based on several sums of weighted initial probability distributions associated with other datasets of the at least one of the supersets, as respectively obtained for several supersets of interest, with which the each unlabeled dataset is associated, and wherein distances between datasets of the each of the supersets of interest are computed according to a distance metric associated with each of the supersets of interest, respectively, and wherein the distance metric is determined based on metadata fields of the datasets of the each of the supersets of interest, and wherein the distance metric is determined based on common metadata fields shared by the datasets of the each of the supersets of interest, whereby a distance between two datasets f1, f2 is computed as a symmetric divergence measure between two conditional probability distributions P(R|k, vk(f1)) and P(R|k, vk(f2)), respectively pertaining to the two datasets f1, f2, and wherein a conditional probability distribution P(R|(k, vk(f)) is an empirical distribution of probability, obtained from the labeled datasets, of observing a given relevance value R when a file f has metadata values vk(f) for a set of metadata fields k; and manage labeled datasets in the storage system based on their determined relevance values.

* * * * *